United States Patent
Cheng et al.

(10) Patent No.: US 12,531,312 B2
(45) Date of Patent: Jan. 20, 2026

(54) ULTRATHIN DIGITAL BATTERY SEPARATOR WITH GOOD HEAT RESISTANCE AND HIGH IONIC CONDUCTIVITY AND PREPARATION METHOD THEREFOR

(71) Applicant: ZHUHAI ENERGY NEW MATERIALS TECHNOLOGY CO., LTD., Zhuhai (CN)

(72) Inventors: Alex Cheng, Shanghai (CN); Jiayuan Huang, Shanghai (CN); Ting Gu, Shanghai (CN); Fangbo He, Shanghai (CN); Qianqian Liu, Shanghai (CN)

(73) Assignee: ZHUHAI ENERGY NEW MATERIALS TECHNOLOGY CO., LTD., Zhuhai (CN)

( * ) Notice: Subject to any disclaimer, the term of this patent is extended or adjusted under 35 U.S.C. 154(b) by 504 days.

(21) Appl. No.: 18/013,783

(22) PCT Filed: Mar. 11, 2021

(86) PCT No.: PCT/CN2021/080285
§ 371 (c)(1),
(2) Date: Dec. 29, 2022

(87) PCT Pub. No.: WO2022/001174
PCT Pub. Date: Jan. 6, 2022

(65) Prior Publication Data
US 2023/0299423 A1    Sep. 21, 2023

(30) Foreign Application Priority Data
Jun. 29, 2020 (CN) .......................... 202010609605.6

(51) Int. Cl.
| | |
|---|---|
| *H01M 50/44* | (2021.01) |
| *H01M 50/403* | (2021.01) |
| *H01M 50/417* | (2021.01) |
| *H01M 50/446* | (2021.01) |
| *H01M 50/449* | (2021.01) |
| *H01M 50/491* | (2021.01) |
| *H01M 50/497* | (2021.01) |

(52) U.S. Cl.
CPC ....... *H01M 50/449* (2021.01); *H01M 50/403* (2021.01); *H01M 50/417* (2021.01); *H01M 50/446* (2021.01); *H01M 50/491* (2021.01); *H01M 50/497* (2021.01)

(58) Field of Classification Search
CPC ............. H01M 50/449; H01M 50/497; H01M 50/451; H01M 50/494; H01M 50/403; H01M 50/406; H01M 50/417; H01M 50/414; H01M 50/491; H01M 50/446
See application file for complete search history.

(56) References Cited

U.S. PATENT DOCUMENTS 10,056,589 B2    8/2018    Ryu et al.

FOREIGN PATENT DOCUMENTS

| CN | 104183867 A | * | 12/2014 | ............... C09D 5/24 |
| CN | 106784542 A |   | 5/2017 | |
| CN | 109817865 A | * | 5/2019 | ............... H01M 2/14 |
| CN | 111244374 A | * | 6/2020 | ........... H01M 50/403 |
| CN | 111769243 A | * | 10/2020 | ........ H01M 10/0525 |
| JP | 2005268095 A |   | 9/2005 | |
| JP | 2006019146 A |   | 1/2006 | |
| JP | 2015220223 A |   | 12/2015 | |
| JP | 2019521469 A |   | 7/2019 | |
| KR | 101455943 B1 |   | 11/2014 | |
| WO | 2013133074 A1 |   | 9/2013 | |
| WO | 2019192474 A1 |   | 10/2019 | |

OTHER PUBLICATIONS

Computer-generated translation of CN-109817865) Wang et al, "A Composite Separator and Its Preparation Method", May 28, 2019.*
Computer-generated translation of CN-104183867) Cui et al, "A Single Ion Conductor Reinforced by Nano Particles Preparation Method and Application of the Lithium Battery Membrane or Polymer Electrolyte", Dec. 3, 2014.*
Computer-generated translation of CN-111244374) Zhang et al, "A Structure Improved Coating Diaphragm and Preparation Method Thereof", Jun. 5, 2020.*
Computer-generated translation of CN-111769243) Cheng et al, "Diaphragm of Digital Battery and Preparation Method Thereof", Oct. 13, 2020.*
Japan Patent Office, "Office Action", Sep. 26, 2024, Japan.
Japan Patent Office, "Office Action", Mar. 24, 2025, Japan.
China Patent Office, "Office Action", Dec. 31, 2020, China.
European Patent Office, "Search Report", Jul. 29, 2025, Germany.

* cited by examiner

*Primary Examiner* — Raymond Alejandro
(74) *Attorney, Agent, or Firm* — Troutman Pepper Locke LLP; Tim Tingkang Xia, Esq.

(57) ABSTRACT

A digital battery separator comprises a base membrane and a polymer coating coated on at least one surface of the base membrane, wherein the thickness of the separator is 3-10 µm, and the ionic conductivity of the separator is 0.704-4.70 mS·cm$^{-1}$. A thinner and safer battery separator with a smaller resistance, better porosity and air permeability, and better heat resistance is obtained. Additionally, a method for preparing the digital battery separator is also provided herein.

7 Claims, 1 Drawing Sheet

ULTRATHIN DIGITAL BATTERY SEPARATOR WITH GOOD HEAT RESISTANCE AND HIGH IONIC CONDUCTIVITY AND PREPARATION METHOD THEREFOR

TECHNICAL FIELD

The present invention relates to the technical field of separator production, and in particular to a digital battery separator and a method for preparing the same.

BACKGROUND

Lithium-ion battery is composed of four key materials, namely a positive electrode plate, a negative electrode plate, a separator and an electrolyte material. In the structure of the lithium battery, the separator is one of the key inner components and is mainly used to separate the positive and negative electrodes of the battery, prevent contact between the two electrodes that may otherwise cause a short circuit, and enable lithium ions to pass through. The performance of the separator directly determines the service life, safety in use, discharge rate, internal resistance, porosity, electrolyte uptake and capacity of the battery, and plays an important role in improving the comprehensive performance of the battery. A thickness of the battery separator is one of the main factors influencing the performance of the battery and is also a hot spot of our research.

With the upgrading of digital products, the market tends to demand for ultrathin separators, and meanwhile, higher requirements are put forward for the performance of ultrathin separators in terms of for example heat resistance and thermal shrinkage.

SUMMARY

An objective of the present invention is to provide an ultrathin digital battery separator with good heat resistance and high ionic conductivity.

In order to achieve the above objective, the present invention adopts the following technical solutions:

Provided is a digital battery separator, comprising a base membrane and a polymer coating coated to at least one surface of the base membrane, wherein the separator has a thickness of 3-10 μm and an ionic conductivity of 0.70-4.70 mS·cm$^{-1}$.

Compared with the prior art, the present invention has the following beneficial effects:

Compared with current commercial separators, the digital battery separator of the present invention has the advantages of being thinner, occupies less space and possesses better heat resistance, and can maintain a lower thermal shrinkage at a high temperature, which can provide good safety and effectively avoid dangerous accidents such as a short circuit inside the battery caused by the fact that the separator is punctured due to thermal shrinkage at a high temperature.

Another objective of the present invention is to provide a method for preparing the digital battery separator described above.

In order to achieve the above objective, the present invention adopts the following technical solutions:

S1: mixing and stirring an organic-inorganic polymer, a dispersant and a binder to obtain a slurry;

S2: coating the slurry to a surface of a base membrane at a temperature of T1 with winding and unwinding tensions of 1-20 N during coating and a rate of difference of 0.1%-10% of coating-stretching speed to obtain a separator product, performing rewinding of the separator product at a rewinding temperature of T2, then performing slitting with winding and unwinding tensions of 0.5-30 N and a contact pressure of 0.01-0.2 N to obtain a digital battery separator after slitting is completed.

Compared with the prior art, the present invention has the following beneficial effects:

The digital battery separator prepared by the method of the present invention is thinner than the current commercial separators. In addition to improving porosity and air permeability of the separator, it also helps to reduce the battery impedance and the self-resistance of the separator, effectively improving the ionic conductivity of the separator, thereby improving the capacity and rate performance of the battery and prolonging the service life of the battery.

BRIEF DESCRIPTION OF THE DRAWING

FIG. 1 is a schematic view of the structure of the digital battery separator according to the present invention.

The description of the reference numerals in the drawing is as follows:

1 is a base membrane;
2 is a polymer coating.

DETAILED DESCRIPTION

The specific embodiments of the digital battery separator of the present invention are provided below.

Example 1

As shown in FIG. 1, the present invention provides a digital battery separator comprising a base membrane 1 and a polymer coating 2 coated to one of the surfaces of the base membrane 1.

The digital battery separator described above was prepared as follows:

S1: an organic-inorganic polymer with a mass fraction of 99%, a dispersant with a mass fraction of 0.5%, and a binder with a mass fraction of 0.5% were mixed and stirred at 800 rpm for 1 h to obtain a slurry with a particle size of 2 nm;

S2: the slurry was coated to a surface of the base membrane at T1 (50° C.) with a rate of difference of 5% of a coating-stretching speed, and then dried at 50° C. to obtain a separator product; then rewinding of the separator product was performed at a rewinding temperature of T2 (75° C.) and with winding and unwinding tensions of 10 N. Finally, slitting was performed with winding and unwinding tensions of 0.5 N and a contact pressure of 0.01 N. After slitting was completed, a finished product of the digital battery separator of the present invention was obtained.

As determined by tests, the finished product of the digital battery separator of according to this example had a thickness of 7 μm, a Gurley value of 200 s/100 cc, a porosity of less than or equal to 30%, a thermal shrinkage at 200° C. of greater than or equal to 8%, and a self-resistance of greater than or equal to 30Ω. The resistance of the battery was greater than or equal to 100Ω, and the ionic conductivity of the separator was 0.70-1.70 mS·cm$^{-1}$.

Example 2

A digital battery separator as shown in FIG. 1 was prepared according to the preparation method in Example 1, with the following differences:

The base membrane being coated in step S2 is a PE base membrane;

The winding and unwinding tensions during slitting was 10 N in step S2.

As determined by tests, the finished product of the digital battery separator according to this example had a thickness of 7 μm, a Gurley value of 200 s/100 cc, a porosity of 30%-60%, a thermal shrinkage at 200° C. of less than or equal to 3%, and a self-resistance of 0.1-30Ω. The resistance of the battery was 10-100Ω, and the ionic conductivity of the separator was 2.10-4.70 mS·cm$^{-1}$.

Example 3

The preparation was carried out according to the preparation method in Example 1, except that the winding and unwinding tensions during slitting was 30 N in step S2, while it was 0.5 N in Example 1.

As determined by tests, the finished product of the digital battery separator according to this embodiment had a thickness of 7 μm and a Gurley value of 200 s/100 cc. The resulting coated separator had a porosity of less than or equal to 30%, a thermal shrinkage at 200° C. of greater than or equal to 8%, and a self-resistance of greater than or equal to 30Ω. The resistance of the battery was greater than or equal to 100Ω, and the ionic conductivity of the separator was 0.70-1.70 mS·cm$^{-1}$.

Example 4

The preparation was carried out according to the preparation method in Example 1, with the following differences:

In S2, the rate of difference of the coating-stretching speed was 10%, and the contact pressure was 0.1 N.

As determined the tests, the separator had a thickness of 3 μm, a Gurley value of 300 s/100 cc, a porosity of less than or equal to 30%, a thermal shrinkage at 200° C. of greater than or equal to 8%, and a self-resistance of greater than or equal to 30Ω. The resistance of the battery was greater than or equal to 100Ω, and the ionic conductivity of the separator was 0.70-1.70 mS·cm$^{-1}$.

Example 5

The preparation was carried out according to the preparation method in Example 1, with the following differences:

In step S1, the organic-inorganic polymer, the dispersant, and the binder were stirred in a spray-coating machine at a stirring speed of 700 rpm for 0.01 h, and the slurry obtained has a particle size of 0.1 nm.

In step S2, the slurry was coated at a coating temperature of T1 (70° C.) and with the rate of difference of the coating-stretching speed being 0.1%, the winding and unwinding tensions were 20 N during coating, and then the rewinding was performed at T2 (70° C.).

As determined by tests, the finished product of the digital battery separator according to this embodiment had a thickness of 10 μm, a Gurley value of 80 s/100 cc, a porosity of less than or equal to 30%, a thermal shrinkage at 200° C. of greater than or equal to 8%, and a self-resistance of greater than or equal to 30Ω. The resistance of the battery was greater than or equal to 100Ω, and the ionic conductivity of the separator was 0.70-1.70 mS·cm$^{-1}$.

Example 6

The preparation was carried out according to the preparation method in Example 1, with the following differences:

In step S1, the organic-inorganic polymer, the dispersant, and the binder were stirred in a spray-coating machine at a stirring speed of 1300 rpm for 7 h, and the slurry obtained has a particle size of 10 nm.

In step 2, the finished slurry was coated to a PE base membrane at a coating temperature of T1 (60° C.) and with the rate of difference of the coating-stretching speed being 6%, and the winding and unwinding tensions were 1 N during coating. Rewinding was then performed at the rewinding temperature being T2 (100° C.). Slitting was performed with the winding and unwinding tensions being 5 N and the contact pressure being 0.2 N.

As determined by tests, the finished product of the digital battery separator according to this embodiment had a thickness of 6 μm and a Gurley value of 20 s/100 cc. The resulting coated separator had a porosity of 30%-60%, a thermal shrinkage at 200° C. of less than or equal to 3%, and a self-resistance of 0.1-30Ω. The resistance of the battery was 10-100Ω, and the ionic conductivity of the separator was 2.10-4.70 mS·cm$^{-1}$.

Example 7

The preparation was carried out according to the preparation method in Example 1, with the following differences:

In S2, coating was performed with the rate of difference of the coating-stretching speed being 4%, and slitting was performed with the winding and unwinding tensions being 15 N.

As determined by tests, the finished product of the digital battery separator according to this embodiment had a thickness of 8 μm and a Gurley value of 200 s/100 cc. The resulting coated separator had a porosity of 30-60 s/100 cc, a thermal shrinkage at 200° C. of less than or equal to 3%, and a self-resistance in a range of 0.1-30Ω. The resistance of the battery was 10-100Ω, and the ionic conductivity of the separator was 2.10-4.70 mS·cm$^{-1}$.

Table 1 shows the data results of the tests for thermal shrinkage performance, self-resistance, impedance, porosity and ionic conductivity of the digital battery separators prepared under different winding and unwinding tensions during slitting according to the present invention.

Table 2 shows the data results of the tests for thermal shrinkage performance, self-resistance, impedance, porosity and ionic conductivity of the digital battery separators prepared under different rates of difference of the coating-stretching speed according to the present invention.

Table 3 shows the data results of the tests for thermal shrinkage performance, self-resistance, impedance, porosity and ionic conductivity of the digital battery separators with different thicknesses according to the present invention.

Table 4 shows the data results of the tests for thermal shrinkage performance, self-resistance, impedance, porosity and ionic conductivity of the digital battery separators with different Gurley values according to the present invention.

TABLE 1

| | Item | | |
|---|---|---|---|
| | Digital battery separator under winding and unwinding tensions of 0.5N during slitting | Digital battery separator under winding and unwinding tensions of 10N during slitting | Digital battery separator under winding and unwinding tensions of 30N during slitting |
| MD thermal shrinkage (200° C. & 1 h) | ≥8% | ≤3% | ≥8% |

TABLE 1-continued

| Item | Digital battery separator under winding and unwinding tensions of 0.5N during slitting | Digital battery separator under winding and unwinding tensions of 10N during slitting | Digital battery separator under winding and unwinding tensions of 30N during slitting |
|---|---|---|---|
| TD thermal shrinkage (200° C. & 1 h) | ≥8% | ≤3% | ≥8% |
| Self-resistance (Ω) | ≥30 | 0.1-30 | ≥30 |
| Resistance of battery (Ω) | ≥100 | 10-100 | ≥100 |
| Porosity (s/100 cc) | ≤30 | 30-60 | ≤30 |
| Ionic conductivity (mS · cm$^{-1}$) | 0.70-1.70 | 2.10-4.70 | 0.70-1.70 |

TABLE 2

| Item | Digital battery separator under a rate of difference of 0.1% of coating-stretching speed | Digital battery separator under a rate of difference of 5% of coating-stretching speed | Digital battery separator under a rate of difference of 10% of coating-stretching speed |
|---|---|---|---|
| MD thermal shrinkage (200° C. & 1 h) | ≥8% | ≤3% | ≥8% |
| TD thermal shrinkage (200° C. & 1 h) | ≥8% | ≤3% | ≥8% |
| Self-resistance (Ω) | ≥30 | 0.1-30 | ≥30 |
| Resistance of battery (Ω) | ≥100 | 10-100 | ≥100 |
| Porosity (s/100 cc) | ≤30 | 30-60 | ≤30 |
| Ionic conductivity (mS · cm$^{-1}$) | 0.70-1.70 | 2.10-4.70 | 0.70-1.70 |

TABLE 3

| Item | Digital battery separator with a thickness of 3 μm | Digital battery separator with a thickness of 7 μm | Digital battery separator with a thickness of 10 μm |
|---|---|---|---|
| MD thermal shrinkage (200° C. & 1 h) | ≥8% | ≤3% | ≥8% |
| TD thermal shrinkage (200° C. & 1 h) | ≥8% | ≤3% | ≥8% |
| Self-resistance (Ω) | ≥30 | 0.1-30 | ≥30 |
| Resistance of battery (Ω) | ≥100 | 10-100 | ≥100 |
| Porosity (s/100 cc) | ≤30 | 30-60 | ≤30 |
| Ionic conductivity (mS · cm$^{-1}$) | 0.70-1.70 | 2.10-4.70 | 0.70-1.70 |

TABLE 4

| Item | Digital battery separator with a Gurley value of 80 s/100 cc | Digital battery separator with a Gurley value of 200 s/100 cc | Digital battery separator with a Gurley value of 300 s/100 cc |
|---|---|---|---|
| MD thermal shrinkage (200° C. & 1 h) | ≥8% | ≤3% | ≥8% |
| TD thermal shrinkage (200° C. & 1 h) | ≥8% | ≤3% | ≥8% |
| Self-resistance (Ω) | ≥30 | 0.1-30 | ≥30 |
| Resistance of battery (Ω) | ≥100 | 10-100 | ≥100 |
| Porosity (s/100 cc) | ≤30 | 30-60 | ≤30 |
| Ionic conductivity (mS · cm$^{-1}$) | 0.70-1.70 | 2.10-4.70 | 0.70-1.70 |

As shown in Table 1, from the data results of the tests for battery impedance, self-resistance, porosity and ionic conductivity of the digital battery separators of the present invention, it can be seen that the digital battery separators had different performances under different winding and unwinding tensions during slitting. When the winding and unwinding tensions were 0.5 N or 30 N during slitting, the thermal shrinkage of the digital battery separator was greater than or equal to 8%, the resistance of the battery was greater than or equal to 100Ω, and the separator had a self-resistance of greater than or equal to 30Ω, a porosity of less than or equal to 30% and an ionic conductivity of 0.70-1.70 mS·cm$^{-1}$. When the winding and unwinding tensions were 10 N during slitting, the thermal shrinkage of the digital battery separator was less than or equal to 3%, the resistance of the battery was 10-100Ω, and the separator had a self-resistance of 0.1-30Ω, a porosity of 30%-60% and an ionic conductivity of 2.10-4.70 mS·cm$^{-1}$. In summary, the digital battery separators have better performance when the winding and unwinding tensions are 0.5-30 N during slitting. Among them, the digital battery separator prepared under winding and unwinding tensions of 10 N during slitting has great development prospects because it has better performance in safe resistance value, heat insulation and heat resistance, as well as lower impedance and higher ionic conductivity, and can therefore effectively avoid thermal shrinkage or separator puncture at a high temperature which may otherwise lead to direct contact between the positive and negative electrodes and thus a short circuit inside the battery which will cause a potential safety hazard.

As shown in Table 2, from the data results of the tests for battery impedance, self-resistance, porosity, and ionic conductivity of the digital battery separators of the present invention, it can be seen that the digital battery separators had different performances under different rates of difference of the coating-stretching speed. When the rate of difference of the coating-stretching speed was 0.1% or 10%, the thermal shrinkage of the digital battery separator was greater than or equal to 8%, the resistance of the battery was greater than or equal to 100Ω, and the separator had a self-resistance of greater than or equal to 30Ω, a porosity of less than or equal to 30% and an ionic conductivity of 0.70-1.70 mS·cm$^{-1}$. When the rate of difference of the coating-stretching speed was 5%, the thermal shrinkage of the digital battery separator was less than or equal to 3%, the resistance of the battery was 10-100Ω, and the separator had a self-resistance of 0.1-30Ω, a porosity of 30%-60% and an ionic conductivity of 2.10-4.70 mS·cm$^{-1}$. In summary, the digital battery separators have better performance when the rate of difference of the coating-stretching speed is 0.1%-10%. Among them, the digital battery separator prepared under a rate of difference of 5% of the coating-stretching speed has great development prospects because it has better performance in safe resistance value, heat insulation and heat resistance, as well as lower impedance and higher ionic conductivity, and can therefore effectively avoid thermal shrinkage or separator puncture at a high temperature which may otherwise lead to direct contact between the positive and negative electrodes and thus a short circuit inside the battery which will cause a potential safety hazard.

As shown in Table 3, from the data results of the tests for battery impedance, self-resistance, porosity, air permeability, and ionic conductivity of the digital battery separators of the present invention, it can be seen that the digital battery separators with different thicknesses had different performances. When the thickness of the separator was 3 μm or 10 μm, the thermal shrinkage of the digital battery separator was greater than or equal to 8%, the resistance of the battery was greater than or equal to 100Ω, and the separator had a self-resistance of greater than or equal to 30Ω, a porosity of less than or equal to 30% and an ionic conductivity of 0.70-1.70 mS·cm$^{-1}$. When the coating thickness was 7 μm, the thermal shrinkage of the digital battery separator was less than or equal to 3%, the resistance of the battery was 10-100Ω, and the separator had a self-resistance of 0.1-30Ω, a porosity of 30%-60% and an ionic conductivity of 2.10-4.70 mS·cm$^{-1}$. In summary, the digital battery separators with a thickness of 3-10 μm have better performance. Among them, the digital battery separator with a thickness of 7 μm has great development prospects because it has better performance in safe resistance value, heat insulation and heat resistance, as well as lower impedance and higher ionic conductivity, and can therefore effectively avoid thermal shrinkage or separator puncture at a high temperature which may otherwise lead to direct contact between the positive and negative electrodes and thus a short circuit inside the battery which will cause a potential safety hazard.

As shown in Table 4, from the data results of the tests for battery impedance, self-resistance, porosity, and ionic conductivity of the digital battery separators of the present invention, it can be seen that the digital battery separators with different Gurley values had different performances. When the Gurley value of the separator was 80 s/100 cc or 300 s/100 cc, the thermal shrinkage of the digital battery separator was greater than or equal to 8%, the resistance of the battery was greater than or equal to 100Ω, and the separator had a self-resistance of greater than or equal to 30Ω, a porosity of less than or equal to 30% and an ionic conductivity of 0.70-1.70 mS·cm$^{-1}$. When the Gurley value of the separator was 200 s/100 cc, the thermal shrinkage of the digital battery separator was less than or equal to 3%, the resistance of the battery was 10-100Ω, and the separator had a self-resistance of 0.1-30Ω, a porosity of 30%-60% and an ionic conductivity of 2.10-4.70 mS·cm$^{-1}$. In summary, the digital battery separators with a Gurley value of 80-300 s/100 cc have better performance. Among them, the digital battery separator with a Gurley value of 200 s/100 cc has great development prospects because it has better performance in safe resistance value, heat insulation and heat resistance, as well as lower impedance and higher ionic conductivity, and can therefore effectively avoid thermal shrinkage or separator puncture at a high temperature which may otherwise lead to direct contact between the positive and negative electrodes and thus a short circuit inside the battery which will cause a potential safety hazard.

The above descriptions are only preferred embodiments of the present invention. It should be noted that those of ordinary skill in the art can also make several improvements and modifications without departing from the concepts of the present invention, and such improvements and modifications shall fall within the protection scope of the present invention.

The invention claimed is:

1. A method for preparing a digital battery separator, comprising:
    S1: mixing and stirring an organic-inorganic polymer, a dispersant and a binder to obtain a slurry;
    S2: coating the slurry to at least one surface of a base membrane at a first temperature with winding and unwinding tensions of 1-20 N during coating and a rate of difference of 0.1%-10% of coating-stretching speed to obtain a separator product, performing rewinding of the separator product at a second temperature being a rewinding temperature, and then performing slitting with winding and unwinding tensions of 0.5-30 N and a contact pressure of 0.01-0.2 N to obtain the digital battery separator after slitting is completed.

2. The method for preparing the digital battery separator according to claim 1, wherein in step S1, the organic-inorganic polymer, the dispersant and the binder are stirred at a speed of 700-1300 rpm for 0.01-7 h to obtain the slurry with a particle size of 0.1-10 nm; and in step S2, the first temperature is 50-70° C. and the second temperature is 70-100° C.

3. The method for preparing the digital battery separator according to claim 1, wherein the separator has a thickness of 3-10 μm and an ionic conductivity of 0.70-4.70 mS·cm$^{-1}$.

4. The method for preparing the digital battery separator according to claim 1, wherein the separator has a Gurley value of 80-300 s/100 cc.

5. The method for preparing the digital battery separator according to claim 1, wherein the separator has a thickness of 6-8 μm, an ionic conductivity of 2.10-4.70 mS·cm$^{-1}$, and a thermal shrinkage less than or equal to 3% at 200° C.

6. The method for preparing the digital battery separator according to claim 5, wherein the separator has a self-resistance of 0.1-30Ω and a porosity of 30%-60%.

7. The method for preparing the digital battery separator according to claim 1, wherein the polymer coating comprises the following materials in mass fraction: 98%-99.8% of the organic-inorganic polymer, 0.1%-1% of the dispersant, and 0.1%-1% of the binder.

* * * * *